United States Patent
Kumon et al.

(10) Patent No.: US 7,759,406 B2
(45) Date of Patent: Jul. 20, 2010

(54) PROCESS FOR PRODUCING POLYSILSESQUIOXANE GRAFT POLYMER, PRESSURE-SENSITIVE ADHESIVE, AND PRESSURE-SENSITIVE ADHESIVE SHEET

(75) Inventors: Taketo Kumon, Yokohama (JP); Toshifumi Kageyama, Yokosuka (JP); Atsuko Kimura, Tokyo (JP); Toshio Sugizaki, Yokohama (JP); Osamu Moriya, Yokohama (JP)

(73) Assignee: Lintec Corporation, Tokyo (JP)

( * ) Notice: Subject to any disclaimer, the term of this patent is extended or adjusted under 35 U.S.C. 154(b) by 630 days.

(21) Appl. No.: 10/584,895

(22) PCT Filed: Sep. 22, 2004

(86) PCT No.: PCT/JP2004/013838

§ 371 (c)(1),
(2), (4) Date: Aug. 28, 2007

(87) PCT Pub. No.: WO2005/080459

PCT Pub. Date: Sep. 1, 2005

(65) Prior Publication Data

US 2008/0051487 A1    Feb. 28, 2008

(30) Foreign Application Priority Data

Feb. 25, 2004    (JP)    ............................. 2004-049894

(51) Int. Cl.
C08F 2/46    (2006.01)
C08F 2/50    (2006.01)
C08J 3/28    (2006.01)
C08F 4/58    (2006.01)

(52) U.S. Cl. .................... 522/99; 522/148; 522/172; 522/134; 522/135; 522/144; 522/162; 522/178; 522/182; 526/90; 526/194; 528/25; 528/31; 528/34; 528/37; 525/100; 525/106; 556/465; 556/479; 428/355 R; 428/446; 428/447; 428/448

(58) Field of Classification Search ............... 522/99, 522/172, 148, 134, 135, 144, 162, 178, 182; 526/90, 194; 528/25, 31, 34, 37; 525/100, 525/106; 556/465, 479; 428/355 R, 446, 428/447, 448

See application file for complete search history.

(56) References Cited

U.S. PATENT DOCUMENTS

| 7,169,873 | B2 * | 1/2007 | Morimoto et al. | ............. | 528/37 |
| 7,256,732 | B2 * | 8/2007 | De Salas et al. | ....... | 342/357.07 |
| 7,294,732 | B2 * | 11/2007 | Ohno et al. | ................ | 556/428 |
| 7,375,170 | B2 * | 5/2008 | Oikawa et al. | ............. | 526/194 |
| 2005/0009982 | A1 * | 1/2005 | Inagaki et al. | ................ | 524/588 |
| 2006/0094849 | A1 * | 5/2006 | Toyoda | ........................ | 528/34 |
| 2006/0287454 | A1 * | 12/2006 | Yamahiro et al. | ........... | 526/279 |

FOREIGN PATENT DOCUMENTS

| JP | 6-256717 A | 9/1994 |
| JP | 8-100035 A | 4/1996 |
| JP | 2002-275438 A | 9/2002 |
| JP | 2003-138229 A | 5/2003 |

OTHER PUBLICATIONS

Taketo Kumon et al., Polymer Preprints, Japan (English Edition), vol. 52, No. 2, Sep. 2003—published Sep. 10, 2003.
Takayuki Otsu et al., Polymer Bulletin 7, pp. 197-203 (1982).
Takayuki Otsu et al., Polymer Bulletin 11, pp. 135-142 (1984).
Zhibin Guan et al., Macromolecules, 27, pp. 5527-5532 (1994).
John Chiefari et al., Macromolecules, 31, pp. 5559-5562, (1998).
Ning Luo et al., J. Polym. Sci.; Part A; Polym. Chem., 40, pp. 1885-1891, (2002).
Yoshitaka Oki et al., Polymer Journal, vol. 34, No. 10, pp. 736-741 (2002).
Koji Ishizu et al., Macromolecules, 36, pp. 2990-2993, (2003).
Hitoshi Asada et al., Polymer Preprints, English, vol. 52, No. 2, Sep. 2003.
Polymer Preprints, Japan, vol. 52, No. 7, Sep. 24-26, 2003.
Polymer Preprints Japan, English Edition, vol. 52, No. 2, Sep. 24-26, 2003.
Synthesis and Properties of Graft Copolymer from ladder like Polysisesquioxane by Photoiniferter, (2003).
English translation of slides reported at $52^{nd}$ SPSJ Symposium on Macromolecules Yamaguchi, Japan Sep. 24-26, 2003.

* cited by examiner

Primary Examiner—Sanza L McClendon
(74) Attorney, Agent, or Firm—Birch, Stewart, Kolasch & Birch, LLP

(57) ABSTRACT

The present invention provides a process for producing a polysilsesquioxane graft polymer (1) which includes applying ionizing radiation or heat to a mixture including a polysilsesquioxane compound (2) and a vinyl compound (3), a polysilsesquioxane compound including an iniferter group, and a pressure-sensitive adhesive and a pressure-sensitive adhesive sheet using the polymer. According to the present invention, a process for producing a polysilsesquioxane graft polymer which may be used as a pressure-sensitive adhesive exhibiting excellent heat resistance and cohesive force, and the like are provided. In the formula, A represents a linking group, $R^1$ represents a hydrocarbon group which may have a substituent, $R^2$ represents a hydrogen atom or the like, $R^3$ represents a polar group or the like, $R^4$ represents a hydrogen atom or the like, $k^1$ to $k^3$ represent arbitrary positive integers, 1 to n represent zero or an arbitrary positive integer (excluding the case where "m=n=0"), and Q represents an iniferter group.

7 Claims, 3 Drawing Sheets

PROCESS FOR PRODUCING POLYSILSESQUIOXANE GRAFT POLYMER, PRESSURE-SENSITIVE ADHESIVE, AND PRESSURE-SENSITIVE ADHESIVE SHEET

TECHNICAL FIELD

The present invention relates to a process for producing a polysilsesquioxane graft polymer which includes adding a vinyl compound to a polysilsesquioxane compound including an iniferter (initiator-transfer agent-terminator) group and applying ionizing radiation or heat to the resulting mixture, a pressure-sensitive adhesive and a pressure-sensitive adhesive sheet using the resulting polysilsesquioxane graft polymer, and a polysilsesquioxane compound including a photoiniferter group.

BACKGROUND ART

As a label sheet attached to various members and instruments, a pressure-sensitive adhesive sheet having a pressure-sensitive adhesive layer formed by applying a pressure-sensitive adhesive to a substrate sheet has been known.

Such a pressure-sensitive adhesive sheet has been widely used in many industrial fields for print label applications, packaging applications, and the like due to the convenience of being immediately attached to the target product by merely applying pressure. In the production control of automobiles and electronic/electronic products, a pressure-sensitive adhesive sheet (label) on which a barcode is printed is attached to parts, for example.

In the production control of automobiles and electronic/electronic products, the parts may be subjected to a heat treatment. Therefore, the label used is required to exhibit heat resistance.

As such a heat-resistant barcode label, a polyimide film or a polyetherimide film has been used. However, since such a film is expensive, the cost of the resulting barcode label is increased. A polyethylene terephthalate film or a polyethylene film generally used as a substrate for a barcode label is inexpensive, but exhibits poor heat resistance.

In order to solve such a problem, JP-A-2002-275438 proposes a heat-resistant label having a print coating layer on one side of a substrate formed by a polyethylene naphthalate film and having a heat-resistant pressure-sensitive adhesive layer exhibiting an adhesion of 0.5 N/25 mm or more at 150° C. on the other side of the substrate. In JP-A-2002-275438, a rubber-based or acrylic pressure-sensitive adhesive or the like is used as the pressure-sensitive adhesive of the heat-resistant pressure-sensitive adhesive layer.

JP-A-2003-138229 discloses a pressure-sensitive adhesive sheet in which a heat-sensitive pressure-sensitive adhesive layer including a heat-resistant aqueous pressure-sensitive adhesive is formed on at least one side of a substrate sheet. As the heat-resistant pressure-sensitive aqueous adhesive, a known aqueous pressure-sensitive adhesive containing an acrylic polymer emulsion or rubber-based latex as the major component and containing a tackifying resin emulsion is used.

However, the pressure-sensitive adhesives used for the pressure-sensitive adhesive sheets disclosed in the above documents do not necessarily exhibit sufficient heat resistance. Therefore, development of a pressure-sensitive adhesive which exhibits further improved heat resistance and adhesion has been demanded.

A method of causing a vinyl compound such as styrene to undergo living radical polymerization by ultraviolet irradiation using a compound including a photoiniferter group as an iniferter (initiator) has been known (Polymer Bulletin, 7, 197 (1982), Polymer Bulletin, 11, 135 (1984), Macromolecules, 27, 5527 (1994), Macromolecules, 31, 5559 (1998), J. Polym. Sci.; Part A; Polym. Chem., 40, 1885 (2002), Polymer Journal, 34, 10, 736 (2002), and Macromolecules, 36, 2990 (2003)).

The present invention was achieved in view of the above-described situation of the related art. An object of the present invention is to provide a process for producing a polysilsesquioxane graft polymer which may be used as a pressure-sensitive adhesive exhibiting excellent heat resistance and cohesive force, a polysilsesquioxane compound including an iniferter group, and a pressure-sensitive adhesive and a pressure-sensitive adhesive sheet using the resulting polysilsesquioxane graft polymer.

DISCLOSURE OF THE INVENTION

The inventors of the present invention have found that a solvent-soluble colorless transparent polysilsesquioxane graft polymer can be efficiently obtained due to the progress of the polymerization reaction by using a polysilsesquioxane compound having a ladder-like structure including an iniferter group as an iniferter, adding a vinyl compound such as acrylamide to the polysilsesquioxane compound, and applying ionizing radiation to the mixture. The inventors of the present invention also have found that the resulting polysilsesquioxane graft polymer is useful as a pressure-sensitive adhesive component exhibiting excellent heat resistance and cohesive force. These findings have led to the completion of the present invention.

According to the present invention, there is provided a process for producing a polysilsesquioxane graft polymer including a repeating unit shown by the following formula (1) in the molecule,

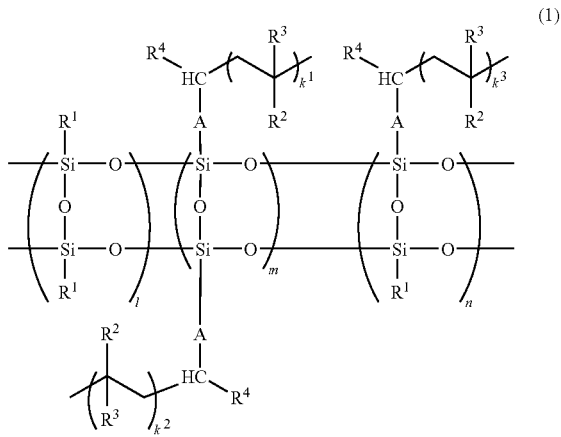

wherein A represents a linking group, $R^1$ represents a hydrocarbon group which may have a substituent, $R^2$ represents a hydrogen atom or an alkyl group having 1 to 18 carbon atoms, $R^3$ represents a polar group or an aryl group which may have a substituent, $R^4$ represents a hydrogen atom, an alkyl group having 1 to 6 carbon atoms, an ester group, or an acyl group, $k^1$, $k^2$, and $k^3$ individually represent arbitrary positive integers, provided that, when $k^1$, $k^2$, and $k^3$ respectively represent two or more, the groups shown by the formula: $-CH_2-C(R^2)(R^3)-$ may be the same or different, and l, m, and n individually represent zero or an arbitrary positive integer, provided that the case where "m=n=0" is excluded, the process comprising applying ionizing radiation or heat to a mixture including a polysilsesquioxane compound including a repeating unit shown by the following formula (2),

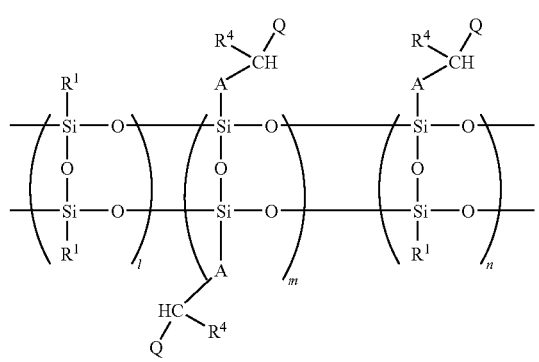

(2)

wherein A, $R^1$, $R^4$, l, m, and n have the same meanings as defined above, and Q represents an iniferter group, and a vinyl compound shown by the following formula (3): $CH_2=C(R^2)—R^3$ (wherein $R^2$ and $R^3$ have the same meanings as defined above).

In the process for producing a polysilsesquioxane graft polymer according to the present invention, it is preferable to apply ionizing radiation to a mixture including the polysilsesquioxane compound including the repeating unit shown by the formula (2) in which Q is a photoiniferter group shown by the following formula: —S—(=S)—Z (wherein Z represents a hydrocarbon group which may have a substituent, an alkoxy group, an aryloxy group which may have a substituent, an amino group which may have a substituent, or a phenyl group which may have a substituent) and the vinyl compound shown by the formula (3): $CH_2=C(R^2)—R^3$ (wherein $R^2$ and $R^3$ have the same meanings as defined above).

It is preferable that the process for producing a polysilsesquioxane graft polymer according to the present invention comprise:

condensing an alkoxysilane compound shown by the following formula (4): $[XCH(R^4)A]Si(OR^5)_3$ (wherein A and $R^4$ have the same meanings as defined above, X represents a halogen atom, and $R^5$ represents an alkyl group having 1 to 6 carbon atoms) and an alkoxysilane compound shown by the following formula (5): $R^1Si(OR^6)_3$ wherein $R^1$ has the same meaning as defined above, and $R^6$ represents an alkyl group having 1 to 6 carbon atoms) in an amount of 0 to 100 parts by weight for 1 part by weight of the alkoxysilane compound shown by the formula (4) in the presence of an acid catalyst or a base catalyst;

reacting the resulting polycondensation product with a compound shown by the following formula (6): $M[SC(=S)—Z]a$ (wherein Z has the same meaning as defined above, M represents an alkali metal atom, an alkaline earth metal atom, or a transition metal atom, and a represents the valence of M) to obtain a polysilsesquioxane compound including a repeating unit shown by the following formula (2') in the molecule,

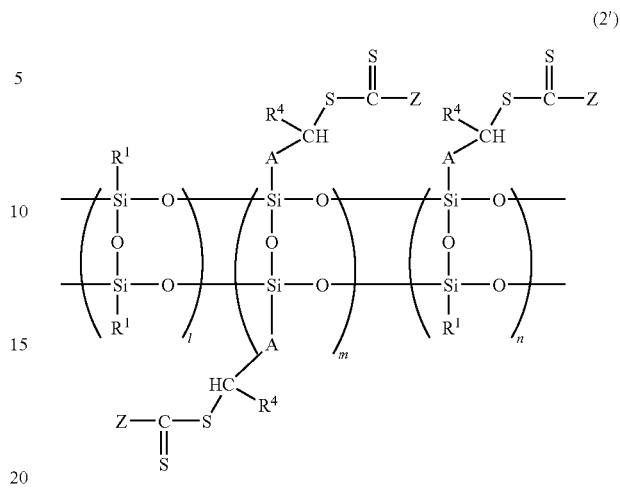

(2')

wherein A represents a linking group, $R^1$ represents a hydrocarbon group which may have a substituent, $R^4$ represents a hydrogen atom, an alkyl group having 1 to 6 carbon atoms, an ester group, or an acyl group, l, m, and n individually represent zero or an arbitrary positive integer, provided that the case where "m=n=0" is excluded, Z represents a hydrocarbon group which may have a substituent, an alkoxy group, an aryloxy group which may have a substituent, an amino group which may have a substituent, or a phenyl group which may have a substituent; and applying ionizing radiation to a mixture including the resulting polysilsesquioxane compound and the vinyl compound shown by the formula (3): $CH_2=C(R^2)—R^3$ (wherein $R^2$ and $R^3$ have the same meanings as defined above).

In the process for producing a polysilsesquioxane graft polymer according to the present invention, it is preferable that the polysilsesquioxane graft polymer have a number average molecular weight of 2,500 to 1,000,000.

According to the present invention, there is provided a polysilsesquioxane compound comprising a repeating unit shown by the following formula (2'),

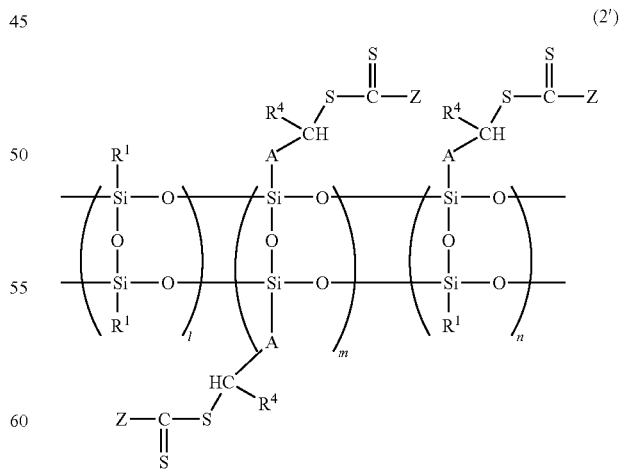

(2')

wherein A represents a linking group, $R^1$ represents a hydrocarbon group which may have a substituent, $R^4$ represents a hydrogen atom, an alkyl group having 1 to 6 carbon atoms, an ester group, or an acyl group, l, m, and n individually represent zero or an arbitrary positive integer, provided that the case where "m=n=0" is excluded, and Z represents a hydrocarbon group which may have a substituent, an alkoxy group, an aryloxy group which may have a substituent, an amino group which may have a substituent, or a phenyl group which may have a substituent.

According to the present invention, there is provided a pressure-sensitive adhesive comprising a polysilsesquioxane graft polymer obtained by the process according to the present invention.

According to the present invention, there is provided a pressure-sensitive adhesive sheet comprising a substrate sheet, and a pressure-sensitive adhesive layer formed on the substrate sheet and including the pressure-sensitive adhesive according to the present invention.

BEST MODE FOR CARRYING OUT THE INVENTION

Figure 1:
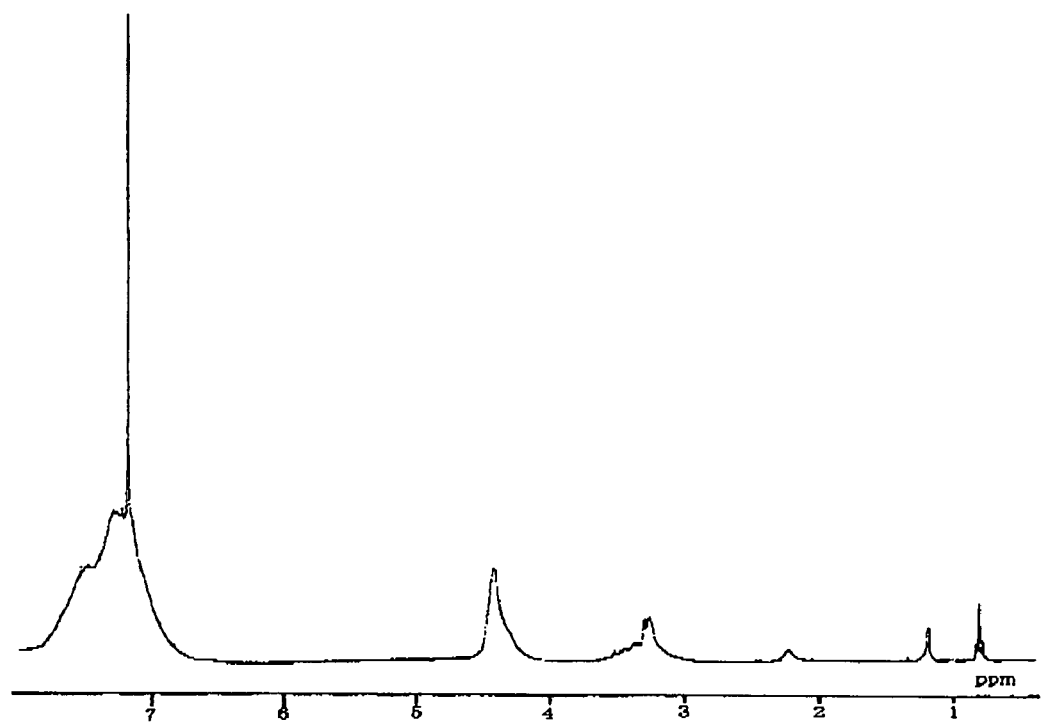
FIG. 1 is a $^1$H-NMR spectrum diagram of polysilsesquioxane compounds (BzCl-PSQ) obtained in Examples 1 to 9 (1).

The present invention is described below in detail in the order of 1) process for producing polysilsesquioxane graft polymer, 2) pressure-sensitive adhesive, and 3) pressure-sensitive adhesive sheet.

1) Process for Producing Polysilsesquioxane Graft Polymer

A process for producing a polysilsesquioxane graft polymer according to the present invention is a process for producing a polysilsesquioxane graft polymer including a repeating unit shown by the formula (1) in the molecule and includes applying ionizing radiation or heat to a mixture including a polysilsesquioxane compound including a repeating unit shown by the formula (2) and a vinyl compound shown by the formula (3).

In the formula (1), A represents a linking group.

As examples of the linking group, a saturated or unsaturated alkylene group which may have a substituent, an arylene group which may have a substituent, and the like can be given.

As specific examples of the saturated alkylene group, saturated alkylene groups having 1 to 20 carbon atoms such as a methylene group, ethylene group, propylene group, trimethylene group, tetramethylene group, pentamethylene group, and hexamethylene group can be given. As specific examples of the unsaturated alkylene group, unsaturated alkylene groups having 2 to 20 carbon atoms such as a vinylene group, propenylene group, butenylene group, and pentenylene group can be given. As specific examples of the arylene group, an o-phenylene group, m-phenylene group, p-phenylene group, and the like can be given.

As examples of the substituent for the saturated and unsaturated alkylene groups, amino groups which may have a substituent such as an amino group, methylamino group, and dimethylamino group; a hydroxyl group; a mercapto group; amide groups which may have a substituent such as an amide group and N,N-dimethylamino group; a carboxyl group; halogen atoms such as a fluorine atom, chlorine atom, and bromine atom; alkoxy groups such as a methoxy group and ethoxy group; alkylthio groups such as a methylthio group and ethylthio group; alkoxycarbonyl groups such as a methoxycarbonyl group and ethoxycarbonyl group; and the like can be given. As examples of the substituent for the arylene group, a cyano group; a nitro group; halogen atoms such as fluorine atom, chlorine atom, and bromine atom; alkoxy groups such as a methoxy group and ethoxy group; alkylthio groups such as a methylthio group and ethylthio group; and the like can be given. The substituent may be bonded to an arbitrary position of the alkylene group or the arylene group. A plurality of substituents, either the same or different, may be bonded to the alkylene group or the arylene group.

In the present invention, A is preferably the saturated or unsaturated alkylene group which may have a substituent, still more preferably the saturated alkylene group which may have a substituent, and particularly preferably the saturated alkylene group having 1 to 20 carbon atoms, since a graft polymer exhibiting excellent heat resistance and adhesion can be obtained.

$R^1$ represents a hydrocarbon group which may have a substituent.

As examples of the hydrocarbon group which may have a substituent represented by $R^1$, alkyl groups such as a methyl group, ethyl group, n-propyl group, isopropyl group, n-butyl group, sec-butyl group, isobutyl group, t-butyl group, n-pentyl group, n-hexyl group, n-heptyl group, n-octyl group, n-nonyl group, and n-decyl group; alkenyl groups such as a vinyl group, 1-propenyl group, 2-propenyl group, isopropenyl group, 3-butenyl group, 4-pentenyl group, and 5-hexenyl group: alkynyl groups such as an ethynyl group, propargyl group, and butynyl group; aryl groups such as a phenyl group, 1-naphthyl group, and 2-naphthyl group; and the like can be given.

As examples of the substituent for the hydrocarbon group represented by $R^1$, the groups given as examples of the substituent for the alkylene group and the arylene group represented by A can be given. The substituent may be bonded to an arbitrary position of the hydrocarbon group. A plurality of substituents, either the same or different, may be bonded to the hydrocarbon group.

$R^2$ represents a hydrogen atom or an alkyl group having 1 to 18 carbon atoms, such as a methyl group, ethyl group, n-propyl group, isopropyl group, n-butyl group, t-butyl group, n-pentyl group, n-hexyl group, n-heptyl group, n-octyl group, n-nonyl group, n-decyl group, or n-dodecyl group.

$R^3$ represents a polar group or an aryl group which may have a substituent.

As examples of the polar group, a carboxyl group; alkoxycarbonyl groups such as a methoxycarbonyl group, ethoxycarbonyl group, propoxycarbonyl group, isopropoxycarbonyl group, butoxycarbonyl group, and t-butoxycarbonyl group; acyl groups such as an acetyl group, propionyl group, and benzoyl group; a cyano group; alkoxy groups such as a methoxy group and ethoxy group; alkylsulfonyl groups such as a methylsulfonyl group and ethylsulfonyl group; arylsulfonyl groups such as a phenylsulfonyl group and p-methylphenylsulfonyl group; and the like can be given.

As examples of the aryl group which may have a substituent, a phenyl group which may have a substituent such as a phenyl group, 2-chlorophenyl group, 3-chlorophenyl group, 4-chlorophenyl group, 4-methylphenyl group, 4-methoxyphenyl group, 4-t-butoxyphenyl group, and 2,4,6-trimethylphenyl group; a naphthyl group which may have a substituent such as a 1-naphthyl group and 2-naphthyl group; and the like can be given.

$R^4$ represents a hydrogen atom, an alkyl group having 1 to 6 carbon atoms, an ester group, or an acyl group. As examples of the alkyl group having 1 to 6 carbon atoms, a methyl group, ethyl group, n-propyl group, isopropyl group, n-butyl group, t-butyl group, n-pentyl group, n-hexyl group, and the like can be given. As examples of the ester group, a methoxycarbonyl group, ethoxycarbonyl group, propylcarbonyl group, and the like can be given. As examples of the acyl group, an acetyl group, propionyl group, and the like can be given.

l, m, and n individually represent zero or an arbitrary positive integer. Note that the case where "m=n=0" is excluded.

$k^1$, $k^2$, and $k^3$ individually represent arbitrary positive integers, provided that, when $k^1$, $k^2$, and $k^3$ respectively represent two or more, the groups shown by the formula: —$CH_2$—C($R^2$)($R^3$)— may be the same or different.

In the formula (2), $R^1$, $R^4$, A, l, m, and n have the same meanings as defined above.

Q represents an iniferter group.

Q may be either a group which can function as a macroinitiator for living radical polymerization of the polysilsesquioxane compound upon application of ionizing radiation (photoiniferter group) or a group which can function as a macroinitiator for living radical polymerization of the polysilsesquioxane compound upon heating (thermal iniferter group). It is preferable that Q be the photoiniferter group, and still more preferably a group shown by the formula: —S—C(=S)—Z, since a target graft polymer can be efficiently obtained.

Z represents a hydrocarbon group which may have a substituent, an alkoxy group, an aryloxy group which may have a substituent, an amino group which may have a substituent, or a phenyl group which may have a substituent.

As examples of the hydrocarbon group which may have a substituent, alkyl groups such as a methyl group and ethyl group; cycloalkyl groups such as a cyclopentyl group and cyclohexyl group; aryl groups such as a phenyl group, 1-naphthyl group, and 2-naphthyl group; and the like can be given. The substituent for the hydrocarbon group is not particularly limited insofar as the substituent is a group inert to reactions for producing the polysilsesquioxane graft polymer according to the present invention. As examples of the substituent for the hydrocarbon group, halogen atoms such as a fluorine atom and chlorine atom (when the hydrocarbon group is an alkyl group, cycloalkyl group, or aryl group); alkoxy groups such as a methoxy group and ethoxy group; alkyl groups such as a methyl group and ethyl group (when the hydrocarbon group is a cycloalkyl group or an aryl group); and the like can be given.

As examples of the alkoxy group, a methoxy group, ethoxy group, propoxy group, and the like can be given.

As examples of the aryloxy group which may have a substituent, a phenoxy group, 2-chlorophenoxy group, 4-chlorophenoxy group, 3-methylphenoxy group, 1-naphthyloxy group, 2-naphthyloxy group, and the like can be given.

As examples of the amino group which may have a substituent, an amino group, dimethylamino group, diethylamino group, methylethylamino group, phenylamino group, and the like can be given.

As examples of the phenyl group which may have a substituent, a phenyl group, 2-methylphenyl group, 3-methylphenyl group, 4-methylphenyl group, and the like can be given.

Of these, the amino group having a substituent is preferable as Z, with a dimethylamino group and a diethylamino group being still more preferable, and a diethylamino group being particularly preferable.

When applying ionizing radiation or heat to the compound having the iniferter group (Q) in the molecule (iniferter: 1a), the iniferter group (Q) dissociates, whereby radicals (1a*, Q*) are produced. The radical (1a*) functions as an initiator (macroinitiator) for living radical polymerization, whereby radically polymerizable monomers ($M_1$) in the system are rapidly polymerized. When the radically polymerizable monomers in the reaction system have been completely polymerized, the polymer terminal reacts with the radical (Q*) to produce a new iniferter (1b). When adding another polymerizable monomer ($M_2$) to the reaction system and applying ionizing radiation or heat, the iniferter group (Q) dissociates again, whereby radicals (1b*, Q*) are produced. The radical (1b*) functions as an initiator (macroinitiator) for living radical polymerization, whereby the radically polymerizable monomers ($M_2$) in the system are rapidly polymerized. When the radically polymerizable monomers in the reaction system have been completely polymerized, the polymer terminal reacts with radical (Q*) to produce a new iniferter (1c) (see the following reaction formula).

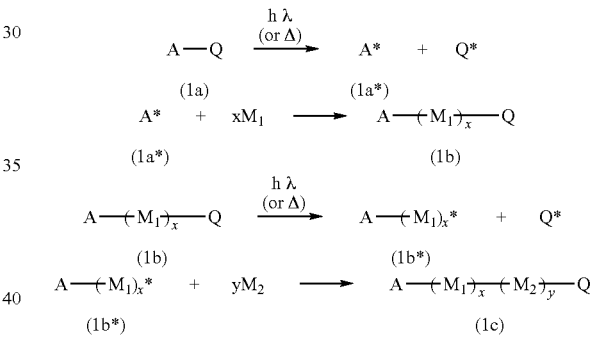

A block copolymer having a desired monomer composition and molecular weight can be efficiently produced by radically polymerizing different radically polymerizable monomers stepwise as described above.

The repeating units of the resulting polysilsesquioxane compound (2) may be shown by the following formulas (a) to (c).

The type of repeating unit is not particularly limited insofar as the polysilsesquioxane compound (2) includes at least the repeating unit shown by the formula (b) and/or the repeating unit shown by the formula (c) in the molecule. When the polysilsesquioxane compound (2) is a copolymer including the repeating unit shown by the formula (a) and the repeating unit shown by the formula (b), the repeating unit shown by the formula (a) and the repeating unit shown by the formula (c), the repeating unit shown by the formula (b) and the repeating unit shown by the formula (c), or the repeating unit shown by the formula (a), the repeating unit shown by the formula (b), and the repeating unit shown by the formula (c), the copolymer may be an arbitrary copolycondensation product such as a random copolymer, partial block copolymer, or complete block copolymer.

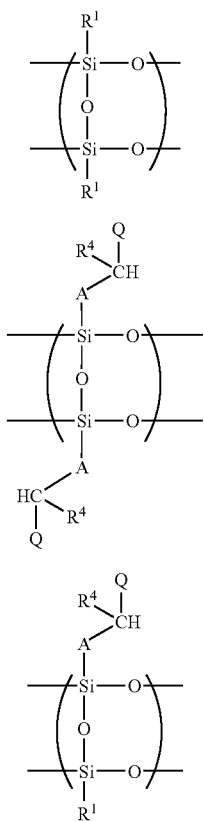

In the present invention, the repeating units shown by the formula (c) may be bonded in a state in which the repeating units are rotated by 180°. For example, the repeating unit shown by the formula (c) may be a repeating unit shown by the following formula (d).

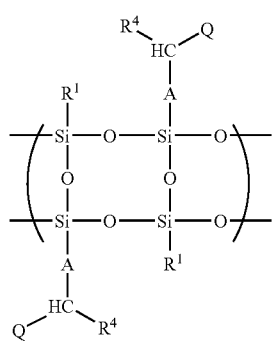

In the present invention, it is preferable to use a polysilsesquioxane compound including the repeating unit shown by the formula (2') (hereinafter referred to as "polysilsesquioxane compound (2')") as the polysilsesquioxane compound (2).

The polysilsesquioxane compound (2') may be produced as follows.

An alkoxysilane compound shown by the formula (4): $[XCH(R^4)A]Si(OR^5)_3$ (hereinafter referred to as "alkoxysilane compound (4)") and an alkoxysilane compound shown by the formula (5): $R^1Si(OR^6)_3$ (hereinafter referred to as "alkoxysilane compound (5)") in an amount of 0 to 100 parts by weight for 1 part by weight of the alkoxysilane compound (4) are condensed in the presence of an acid catalyst or a base catalyst. The resulting copolycondensation product is reacted with a compound shown by the formula (6): $M[SC(=S)—Z]a$ to obtain the polysilsesquioxane compound (2') having a ladder-like structure.

In the alkoxysilane compound (4), A and $R^4$ in the formula (4) have the same meanings as defined above.

X represents a halogen atom such as a fluorine atom, chlorine atom, or bromine atom, and $R^5$ represents an alkyl group having 1 to 6 carbon atoms such as a methyl group, ethyl group, n-propyl group, isopropyl group, n-butyl group, isobutyl group, sec-butyl group, t-butyl group, n-pentyl group, isopentyl group, neopentyl group, or n-hexyl group.

As specific examples of the alkoxysilane compound (4), p-chloromethylphenyltrimethoxysilane, p-chloromethylphenyltriethoxysilane, p-(2-chloroethyl)phenyltrimethoxysilane, p-(2-chloroethyl)phenyltriethoxysilane, p-(3-chloropropyl)phenyltrimethoxysilane, p-(3-chloropropyl)phenyltriethoxysilane, p-bromomethylphenyltrimethoxysilane, p-bromomethylphenyltriethoxysilane, p-(2-bromoethyl)phenyltrimethoxysilane, p-(2-bromoethyl)phenyltriethoxysilane, p-(3-bromopropyl)phenyltrimethoxysilane, p-(3-bromopropyl)phenyltriethoxysilane, p-chloromethylphenylmethyltimethoxysilane, p-chloromethylphenylmethyltriethoxysilane, p-(2-chloroethyl)phenylmethyltrimethoxysilane, p-(2-chloroethyl)phenylmethyltriethoxysilane, p-(3-chloropropyl)phenylmethyltrimethoxysilane, p-(3-chloropropyl)phenylmethyltriethoxysilane, p-bromomethylphenylmethyltrimethoxysilane, p-bromomethylphenylmethyltriethoxysilane, p-(2-bromoethyl)phenylmethyltrimethoxysilane, p-(2-bromoethyl)phenylmethyltriethoxysilane, p-(3-bromopropyl)phenylmethyltrimethoxysilane, p-(3-bromopropyl)phenylmethyltriethoxysilane, 2-(p-chloromethylphenyl)ethyltrimethoxysilane, 2-(p-chloromethylphenyl)ethyltriethoxysilane, 2-(p-chloromethylphenyl)ethyltripropoxysilane, 2-(p-chloromethylphenyl)ethyltributoxysilane, 2-(p-bromomethylphenyl)ethyltrimethoxysilane, 2-(p-bromomethylphenyl)ethyltriethoxysilane, 2-(p-bromomethylphenyl)ethyltripropoxysilane, 2-(m-chloromethylphenyl)ethyltrimethoxysilane, 2-(m-chloromethylphenyl)ethyltriethoxysilane, 2-(m-chloromethylphenyl)ethyltripropoxysilane, 2-(m-chloromethylphenyl)ethyltributoxysilane, 2-(m-bromomethylphenyl)ethyltrimethoxysilane, 2-(m-bromomethylphenyl)ethyltriethoxysilane, 2-(m-bromomethylphenyl)ethyltripropoxysilane, 3-(p-chloromethylphenyl)propyltrimethoxysilane, 3-(p-chloromethylphenyl)propyltriethoxysilane, 3-(p-chloromethylphenyl)propyltripropoxysilane, 3-(p-chloromethylphenyl)propyltributoxysilane, 3-(p-bromomethylphenyl)propyltrimethoxysilane, 3-(p-bromomethylphenyl)propyltriethoxysilane, 3-(m-bromomethylphenyl)propyltripropoxysilane, 3-(m-chloromethylphenyl)propyltrimethoxysilane, 3-(m-chloromethylphenyl)propyltriethoxysilane, 3-(m-chloromethylphenyl)propyltripropoxysilane, 3-(m-chloromethylphenyl)propyltributoxysilane, 3-(m-bromomethylphenyl)propyltrimethoxysilane, 3-(m-bromomethylphenyl)propyltriethoxysilane, 3-(m-bromomethylphenyl)propyltripropoxysilane, 4-(p-chloromethylphenyl)butyltrimethoxysilane, 4-(p-chloromethylphenyl)butyltriethoxysilane, 4-(p-chloromethylphenyl)butyltripropoxysitane, 4-(p-chloromethylphenyl)butyltributoxysilane, 4-(p-bromomethylphenyl)

butyltrimethoxysilane, butyltriethoxysilane, butyltripropoxysilane, phenyltrimethoxysilane, phenyltriethoxysilane, phenyltrimethoxysilane, phenyltriethoxysilane, phenylmethyltrimethoxysilane, phenylmethyltriethoxysilane, phenyltrimethoxysilane, phenylmethyltriethoxysilane, 2-[4'-(p-bromomethylphenyl)phenyl]ethyltrimethoxysilane, 2-[4'-(p-bromomethylphenyl)phenyl]ethyltriethoxysilane, 2-[4'-(p-bromomethylphenyl)phenyl]ethyltrimethoxysilane, 2-[4'-(p-bromomethylphenyl)phenyl]ethyltriethoxysilane, 4-bromomethylphenyl) 4-(p-bromomethylphenyl) 4-(p-bromomethylphenyl) 4-(p-bromomethylphenyl) 4-(p-bromomethylphenyl) 4-(p-bromomethylphenyl) 4-(p-bromomethylphenyl) 4-(p-bromomethylphenyl) 4-(p-bromomethylphenyl) 4-(p-bromomethylphenyl) and combinations of two or more of these compounds can be given.

In the alkoxysilane compound (5), $R^1$ in the formula (5) has the same meaning as defined above, and $R^6$ represents an alkyl group having 1 to 6 carbon atoms. As $R^6$, the groups given as specific examples of $R^5$ can be given.

As specific examples of the alkoxysilane compound (5), (substituted) phenyltrialkoxysilanes such as phenyltrimethoxysilane, 4-chlorophenyltrimethoxysilane, phenyltriethoxysilane, and 2-methoxyphenyltriethoxysilane; alkyltrialkoxysilanes such as methyltrimethoxysilane, methyltriethoxysilane, ethyltrimethoxysilane, ethyltriethoxysilane, n-propyltrimethoxysilane, and n-propyltriethoxysilane; cyanoalkyltrialkoxysilanes such as cyanomethyltrimethoxysilane, cyanomethyltriethoxysilane, 2-cyanoethyltrimethoxysilane, 2-cyanoethyltriethoxysilane, 3-cyanopropyltrimethoxysilane, 3-cyanopropyltriethoxysilane, 4-cyanobutyltrimethoxysilane, and 4-cyanobutyltriethoxysilane; acetoxy group-containing silanes such as acetoxymethyltrimethoxysilane, acetoxymethyltriethoxysilane, 3-acetoxypropyltrimethoxysilane, and 3-acetoxypropyltriethoxysilane; combinations of two or more of these compounds; and the like can be given.

The mixing ratio of the alkoxysilane compound (4) and the alkoxysilane compound (5) may be arbitrarily set. The mixing ratio of the alkoxysilane compound (4) and the alkoxysilane compound (5) is usually set in the range of "alkoxysilane compound (4):alkoxysilane compound (5)=100:0 to 1:99" in parts by weight.

As examples of a solvent used for the reaction between the alkoxysilane compound (4) and the alkoxysilane compound (5), aromatic hydrocarbons such as benzene, toluene, and xylene; esters such as methyl acetate, ethyl acetate, propyl acetate, and methyl propionate; ketones such as acetone, methyl ethyl ketone, methyl isobutyl ketone, and cyclohexanone; alcohols such as methyl alcohol, ethyl alcohol, n-propyl alcohol, isopropyl alcohol, n-butyl alcohol, isobutyl alcohol, sec-butyl alcohol, and t-butyl alcohol; water; and the like can be given. The solvents may be used either individually or in combination of two or more.

As examples of the acid catalyst, inorganic acids such as hydrochloric acid and sulfuric acid; and organic acids such as p-toluenesulfonic acid, p-toluenesulfonic acid monohydrate, sulfonic acid, methanesulfonic acid, ethanesulfonic acid, acetic acid, and formic acid can be given.

As examples of the base catalyst, metal hydroxides such as sodium hydroxide, potassium hydroxide, magnesium hydroxide, and calcium hydroxide; metal alkoxides such as sodium methoxide, sodium ethoxide, potassium methoxide, potassium t-butoxide, magnesium methoxide, and magnesium ethoxide; primary amines such as methylamine, ethylamine, and butylamine; secondary amines such as diethylamine and dibutylamine; tertiary amines such as triethylamine and diisopropylethylamine; nitrogen-containing heterocyclic compounds such as pyridine and 1,8-diazabicyclo[5.4.0]undec-7-ene (DBU); and the like can be given.

The acid catalyst or the base catalyst is used in an amount of usually 0.001 to 10 wt %, and preferably 0.01 to 5 wt % of the alkoxysilane compound (4).

The reaction temperature is usually in the range from 0° C. to the boiling point of the solvent used, and preferably in the range of 40° C. to 130° C. If the reaction temperature is too low, the condensation reaction does not sufficiently proceed. If the reaction temperature is too high, gelation may not be prevented. The reaction is usually completed within several minutes to several hours.

When reacting the resulting copolycondensation product with the compound shown by the formula (6): M[SC(=S)—Z]a, the polysilsesquioxane compound (2') in which the halogen (X) portion of the alkoxysilane compound (4) is replaced with the photoiniferter group (—SC(=S)—Z) is obtained.

In the formula (6), Z has the same meaning as defined above.

M represents an alkali metal atom such as lithium, sodium, or potassium; an alkaline earth metal atom such as magnesium or calcium; or a transition metal atom such as iron, manganese, zinc, or copper. Of these, the alkali metal atom is preferable.

a represents the valence of M.

As specific examples of the compound shown by the formula (6), compounds in which M is the alkali metal atom, such as sodium dimethyldithiocarbamate and sodium diethyldithiocarbamate; compounds in which M is the alkaline earth metal atom, such as magnesium bis(dimethyldithiocarbamate) and magnesium bis(diethyldithiocarbamate); compounds in which M is the transition metal atom, such as copper bis(dimethyldithiocarbamate) and copper bis(diethyldithiocarbamate); and the like can be given.

Of these compounds, the compounds in which M is the alkali metal atom are preferable, with sodium dimethyldithiocarbamate and sodium diethyldithiocarbamate being still more preferable, since these compounds exhibit high reactivity and a polysilsesquioxane graft polymer can be efficiently synthesized from the resulting polysilsesquioxane compound.

The copolycondensation product and the compound shown by the formula (6): M[SC(=S)—Z]a may be reacted in an inert solvent.

As examples of the solvent, aromatic hydrocarbons such as benzene, toluene, and xylene; aliphatic hydrocarbons such as n-pentane, n-hexane, n-heptane, and n-octane; alicyclic hydrocarbons such as cyclopentane, cyclohexane, cycloheptane, and cyclooctane; ethers such as diethyl ether, diisopropyl ether, 1,2-dimethoxyethane, dibutyl ether, tetrahydrofuran, dioxane, anisole, phenyl ethyl ether, and diphenyl ether; halogenated hydrocarbons such as chloroform, carbon tetrachloride, 1,2-dichloroethane, and chlorobenzene; esters such as ethyl acetate, propyl acetate, butyl acetate, and methyl propionate; ketones such as acetone, methyl ethyl ketone, diethyl ketone, methyl isobutyl ketone, and cyclohexanone; amides such as N,N-dimethylformamide, N,N-dimethylacetamide, and N-methylpyrrolidone; nitriles such as acetonitrile and benzonitrile; sulfoxides such as dimethylsulfoxide and sulfolane; and the like can be given. The solvents may be used either individually or in combination of two or more.

The amount of the solvent used is not particularly limited. The solvent is usually used in an amount of 1 to 1,000 ml, and preferably 5 to 100 ml for 1 g of the copolycondensation product.

The reaction temperature is not particularly limited. The reaction temperature is usually in the range from 0° C. to the boiling point of the solvent used, preferably 15 to 60° C., and still more preferably room temperature.

The reaction time is usually several minutes to several tens of hours, and preferably 1 to 20 hours.

After completion of the reaction, a known post-reaction operation is performed to obtain the polysilsesquioxane compound (2') used in the present invention.

The polysilsesquioxane compound (2) having a linear repeating unit structure called a ladder-like structure can be obtained in this manner. Whether or not the reaction product has the ladder-like structure may be confirmed by measuring the infrared absorption spectrum or X-ray diffraction of the reaction product, for example.

In the present invention, the polysilsesquioxane compound (2') including the photoiniferter group at the molecular terminal is particularly preferable as the polysilsesquioxane compound (2).

The number average molecular weight of the polysilsesquioxane compound (2) is usually 500 to 30,000, and preferably 1,000 to 20,000. The number average molecular weight may be measured by size exclusion chromatography (SEC) as a polystyrene-reduced number average molecular weight, for example.

The molecular weight distribution (Mw/Mn) of the polysilsesquioxane compound (2) is not particularly limited. The molecular weight distribution is usually 1.0 to 3.0, and preferably 1.1 to 2.0.

A mixture of the resulting polysilsesquioxane compound (2) and a vinyl compound shown by the formula (3): $CH_2=C(R^2)—R^3$ (wherein $R^2$ and $R^3$ have the same meanings as defined above) (hereinafter referred to as "vinyl compound (3)") is caused to undergo living radical polymerization by applying ionizing radiation or heat to the mixture to obtain a polysilsesquioxane graft polymer including the repeating unit shown by the formula (1).

As examples of the ionizing radiation, ultraviolet rays, electron beams, and the like can be given. In particular, ultraviolet rays are preferable. As the ultraviolet source, a supervoltage mercury lamp, high-voltage mercury lamp, low-voltage mercury lamp, carbon arc, black light lamp, metal halide lamp, or the like may be used.

The reaction temperature is not particularly limited. The reaction temperature is usually in the range from 0° C. to the boiling point of the solvent used, and preferably 20 to 100° C.

The heating temperature is usually 110 to 190° C., and preferably 120 to 180° C.

The vinyl compound (3) is not particularly limited insofar as the compound includes a radically polymerizable vinyl group (double bond). As examples of the vinyl compound (3), an acrylic compound in which $R^3$ in the formula (3) is an alkoxycarbonyl group; an aromatic vinyl compound in which $R^3$ in the formula (3) is an aryl group which may have a substituent; a vinyl nitrile compound in which $R^3$ in the formula (3) is a cyano group; a vinyl ketone compound in which $R^3$ in the formula (3) is an acyl group; a vinyl ether compound in which $R^3$ in the formula (3) is an alkoxy group; a vinyl sulfone compound in which $R^3$ in the formula (3) is an alkylsulfonyl group or an arylsulfonyl group; a vinyl ester compound in which $R^3$ in the formula (3) is an acetoxy group; and the like can be given.

The acrylic compound is not particularly limited insofar as the compound includes a (meth)acryloyl group in the molecule.

IS As specific examples of the acrylic compound, monofunctional (meth)acrylate compounds such as methyl(meth) acrylate, ethyl(meth)acrylate, n-propyl (meth)acrylate, isopropyl(meth)acrylate, n-butyl(meth)acrylate, isobutyl (meth) acrylate, t-butyl(meth)acrylate, n-pentyl(meth)acrylate, n-hexyl(meth)acrylate, 2-ethylhexyl(meth)acrylate, octyl (meth)acrylate, nonyl(meth)acrylate, decyl (meth)acrylate, undecyl(meth)acrylate, dodecyl(meth)acrylate, methoxymethyl (meth)acrylate, methoxy ethylene glycol (meth)acrylate, methoxy polyethylene glycol (meth)acrylate, nonylphenoxyethyl(meth)acrylate, 3-chloro-2-hydroxypropyl (meth) acrylate, phenoxyethyl(meth)acrylate, phenoxy polyethylene glycol (meth)acrylate, butoxy polyethylene glycol (meth) acrylate, cyclohexyl(meth)acrylate, tetrahydrofurfuryl (meth)acrylate, isobornyl(meth)acrylate, benzyl(meth)acrylate, 2-hydroxyethyl(meth)acrylate, 2-(meth) acryloyloxyethyl-2-hydroxyethylphthalic acid, glycerol mono(meth)acrylate, 2-hydroxybutyl(meth)acrylate, polypropylene glycol (meth)acrylate, polyethylene glycol mono(meth)acrylate, poly-ε-caprolactone mono(meth)acrylate, dialkylaminoethyl(meth)acrylate, glycidyl(meth)acrylate, mono[(meth)acryloyloxyethyl]acid phosphate, trifluoroethyl(meth)acrylate, 2,2,3,3-tetrafluoropropyl(meth) acrylate, 2,2,3,4,4,4-hexafluorobutyl(meth)acrylate, perfluorooctylethyl(meth)acrylate, dicyclopentenyloxyalkyl (meth)acrylate, tricyclodecanyloxyethyl(meth)acrylate, isobornyloxyethyl(meth)acrylate, morpholine (meth)acrylate, N,N'-dimethylacrylimide, and N,N'-dimethylacrylamide;

bifunctional (meth)acrylate compounds such as di(meth) acrylate of 2,2-dimethyl-3-hydroxypropyl-2,2-dimethyl-3-hydroxypropionate, ethylene glycol di(meth)acrylate, tetraethylene glycol di(meth)acrylate, polyethylene glycol di(meth)acrylate, propylene glycol di(meth)acrylate, polypropylene glycol di(meth)acrylate, 1,4-butanediol di(meth)acrylate, 1,6-hexanediol di(meth)acrylate, glycerol di(meth)acrylate, neopentyl glycol di(meth)acrylate, di(meth)acrylate of an ethylene oxide addition product of bisphenol A, di(meth)acrylate of a propylene oxide addition product of bisphenol A, di(meth)acrylate of 2,2'-di(hydroxypropoxyphenyl)propane, di(meth)acrylate of 2,2'-di(hydroxyethoxyphenyl)propane, di(meth)acrylate of tricyclodecane dimethylol, dicyclopentadiene di(meth)acrylate, pentane di(meth)acrylate, tricyclodecanedimethanol di(meth)acrylate, (meth)acrylic acid addition product of 2,2'-di(glycidyloxyphenyl)propane, 2-hydroxy-1-(meth)acryloxy-3-(meth)acryloxypropane;

polyfunctional (meth)acrylate compounds such as trimethylolpropane triacrylate, trimethylolpropane tri(oxyethyl) (meth)acrylate, pentaerythritol tri(meth)acrylate, pentaerythritol tetra(meth)acrylate, dipentaerythritol hexa(meth)acrylate, tetramethylolmethane tri(meth)acrylate, tetramethylolmethane tetra(meth)acrylate, tris(acryloxy)isocyanurate, tri (meth)acrylate of tris(2-hydroxyethyl)isocyanurate, and tri (meth)acrylate of tris(hydroxypropyl)isocyanurate; and the like can be given.

As examples of the aromatic vinyl compound, styrene, α-methylstyrene, 4-methylstyrene, 4-methoxystyrene, 4-t-butoxystyrene, 3-chlorostyrene, and the like can be given.

As examples of the vinyl nitrile compound, acrylonitrile, methacrylonitrile, and the like can be given. As examples of the vinyl ketone compound, vinyl methyl ketone, vinyl phenyl ketone, and the like can be given. As examples of the vinyl ether compound, ethyl vinyl ether, propyl vinyl ether, and the like can be given. As examples of the vinyl sulfone compound, vinyl methyl sulfone and the like can be given.

As examples of the vinyl ester compound, vinyl acetate and the like can be given. Of these, it is particularly preferable to use the acrylic compound since a graft polymer exhibiting excellent heat resistance and cohesive force can be efficiently obtained.

In the present invention, the vinyl compound (3) may be used in combination of two or more. In this case, a graft copolymer in which a block copolymer of the vinyl compounds (3) is grafted onto the molecular terminal can be obtained by adding different vinyl compounds (3) stepwise to the polymerization solution.

The vinyl compound (3) is used in an amount of usually 1 to 1,000 parts by weight, and preferably 5 to 200 parts by weight for 1 part by weight of the polysilsesquioxane compound (2).

The solvent used is not particularly limited insofar as the solvent is inert to the reaction. As examples of the solvent, aromatic hydrocarbons such as benzene, toluene, and xylene; aliphatic hydrocarbons such as n-pentane, n-hexane, n-heptane, and n-octane; alicyclic hydrocarbons such as cyclopentane, cyclohexane, cycloheptane, and cyclooctane; ethers such as diethyl ether, diisopropyl ether, 1,2-dimethoxyethane, dibutyl ether, tetrahydrofuran (THF), dioxane, anisole, phenyl ethyl ether, and diphenyl ether; halogenated hydrocarbons such as chloroform, carbon tetrachloride, 1,2-dichloroethane, and chlorobenzene; esters such as ethyl acetate, propyl acetate, butyl acetate, and methyl propionate; ketones such as acetone, methyl ethyl ketone, diethyl ketone, methyl isobutyl ketone, and cyclohexanone; amides such as N,N-dimethylformamide, N,N-dimethylacetamide, and N-methylpyrrolidone; nitrites such as acetonitrile and benzonitrile; sulfoxides such as dimethylsulfoxide and sulfolane; and the like can be given. The solvents may be used either individually or in combination of two or more.

The solvent is used in an amount of usually 0.1 to 1,000 ml, and preferably 1 to 100 ml for 1 g of the polysilsesquioxane compound (2).

The reaction time is usually several minutes to several tens of hours, and preferably 15 minutes to several hours, although the reaction time varies depending on the scale.

When obtaining a graft copolymer in which a block copolymer of two or more vinyl compounds (3) is grafted onto the molecular terminal by adding two or more vinyl compounds (3) stepwise to the polymerization solution, the polymerization temperature and the reaction time may be changed depending on the types of vinyl compounds (3).

After polymerization, residual monomers and/or the solvent are evaporated by a known method. The polymer is then reprecipitated in an appropriate solvent, and the precipitated polymer is filtered or centrifuged to separate the target polymer.

As examples of the solvent used for reprecipitation, water; hydrocarbons and alicyclic hydrocarbons having 5 to 8 carbon atoms such as n-pentane, n-hexane, n-heptane, and cyclohexane; ethers such as diethyl ether and dioxane; alcohols having 1 to 6 carbon atoms such as methanol, ethanol, and isopropanol; and the like can be given. Of these, water, diethyl ether, n-hexane, methanol, or a mixed solvent thereof is preferable.

A polysilsesquioxane graft polymer including the repeating unit shown by the formula (1) can be obtained in this manner.

The number average molecular weight of the polysilsesquioxane graft polymer is not particularly limited. The number average molecular weight of the polysilsesquioxane graft polymer is usually 2,500 to 1,000,000, and preferably 3,000 to 500,000.

According to the production process of the present invention, since the polymerization reaction progresses by means of living polymerization, a polymer having a narrow molecular weight distribution can be obtained.

The molecular weight distribution (Mw/Mn) of the polysilsesquioxane graft polymer is usually 1.0 to 5.0, and preferably 1.3 to 2.5.

The polysilsesquioxane graft polymer has a weight loss rate ($WL_{400}$) measured by thermogravimetric analysis (TGA) when heated to 400° C. of 30% or less, and preferably 25% or less.

The polysilsesquioxane graft polymer exhibits a cohesive force equivalent to or greater than that of a known acrylic pressure-sensitive adhesive.

3) Pressure-Sensitive Adhesive

A pressure-sensitive adhesive according to the present invention includes the polysilsesquioxane graft polymer obtained by the production process according to the present invention.

The pressure-sensitive adhesive according to the present invention may be produced by dissolving one or more polysilsesquioxane graft polymers obtained by the production process according to the present invention in an appropriate solvent.

The solvent used is not particularly limited insofar as the polysilsesquioxane graft polymer obtained by the production process according to the present invention can be dissolved therein.

As examples of the solvent, esters such as ethyl acetate, propyl acetate, butyl acetate, and methyl propionate; ketones such as acetone, methyl ethyl ketone, diethyl ketone, methyl isobutyl ketone, and cyclohexanone; amides such as N,N-dimethylformamide, N,N-dimethylacetamide, and N-methylpyrrolidone; nitriles such as acetonitrile and benzonitrile; sulfoxides such as dimethylsulfoxide and sulfolane; aromatic hydrocarbons such as benzene, toluene, and xylene; aliphatic hydrocarbons such as n-pentane, n-hexane, n-heptane, and n-octane; alicyclic hydrocarbons such as cyclopentane, cyclohexane, cycloheptane, and cyclooctane; ethers such as diethyl ether, diisopropyl ether, 1,2-dimethoxyethane, dibutyl ether, tetrahydrofuran, and dioxane; halogenated hydrocarbons such as chloroform, carbon tetrachloride, 1,2-dichloroethane, and chlorobenzene; and the like can be given. The solvents may be used either individually or in combination of two or more.

The solvent is used in an arbitrary amount. The solvent is used in an amount of usually 1 to 10,000 parts by weight, and preferably 10 to 1,000 parts by weight for 100 parts by weight of the polysilsesquioxane graft polymer obtained by the production process according to the present invention.

The pressure-sensitive adhesive according to the present invention includes the polysilsesquioxane graft polymer obtained by the production process according to the present invention as the major component, and may further include another pressure-sensitive adhesive, tackifier, antioxidant, ultraviolet ray absorber, light stabilizer, softener, filler, and the like.

Since the pressure-sensitive adhesive according to the present invention includes the polysilsesquioxane graft polymer obtained by the production process according to the present invention as the major component, the pressure-sensitive adhesive exhibits extremely excellent heat resistance and exhibits excellent cohesive force.

4) Pressure-Sensitive Adhesive Sheet

A pressure-sensitive adhesive sheet according to the present invention includes a substrate sheet and a pressure-sensitive adhesive layer formed on the substrate sheet and including the pressure-sensitive adhesive according to the present invention.

As examples of the substrate sheet, paper substrates such as glassine paper, coated paper, and cast paper; polyester films such as a polyethylene terephthalate film, polybuthylene terephthalate film, and polyethylene naphthalate film; polyolefin films such as a polypropylene film and polyethylene film; a polyvinyl chloride film; a polyurethane film; synthetic paper, a cellulose sheet and film, nonwoven fabric, fabric, and knitted fabric made of various materials, and the like can be given. An appropriate character, pattern, or the like may be printed on the surface of the substrate sheet, if necessary.

As the method of forming the pressure-sensitive adhesive layer on the substrate sheet, (i) a method of applying the pressure-sensitive adhesive according to the present invention to the substrate sheet to a specific thickness and drying the applied adhesive at 40 to 150° C., (ii) a method of applying the pressure-sensitive adhesive according to the present invention to a release liner (or a release liner for proceeding) to a specific thickness, attaching the substrate sheet to the coated surface, drying the applied adhesive at 40 to 150° C., and pealing off the release liner, and the like can be given. When using the method (ii), the release liner may be allowed to remain and may be removed when using the pressure-sensitive adhesive sheet, if necessary.

As examples of the release liner, paper substrates such as glassine paper, coated paper, and cast paper; polyester films such as a polyethylene terephthalate film, polybuthylene terephthalate film, and polyethylene naphthalate film; polyolefin films such as a polypropylene film and polyethylene film; and the like can be given. A release agent such as a silicone resin may be applied to the surface of the release liner.

The method of applying the pressure-sensitive adhesive to the substrate sheet or the release liner is not particularly limited. A known coating method may be used. As examples of the coating method, a reverse coating method, gravure coating method, reverse gravure method, kiss coating method, knife coating method, bar coating method, die coating method, curtain coating method, and the like can be given. The thickness of the pressure-sensitive adhesive layer is usually 5 to 100 μm, and preferably 10 to 60 μm.

Since the pressure-sensitive adhesive sheet according to the present invention includes the pressure-sensitive adhesive layer formed using the pressure-sensitive adhesive according to the present invention which exhibits excellent heat resistance and cohesive force, the pressure-sensitive adhesive sheet exhibits excellent adhesion and cohesive force and maintains adhesion even when used at high temperature.

EXAMPLES

The present invention is described below in more detail by way of examples and comparative examples. Note that the present invention is not limited to the following examples.

The number average molecular weight (Mn) and the molecular weight distribution (Mw/Mn) were determined as polystyrene-reduced values by measuring the resulting polymer by size exclusion chromatography (SEC) using tetrahydrofuran (THF) as an eluent.

Examples 1 to 9

(1) Synthesis of Ladder-Like Polysilsesquioxane Compound (BzCl-PSQ)

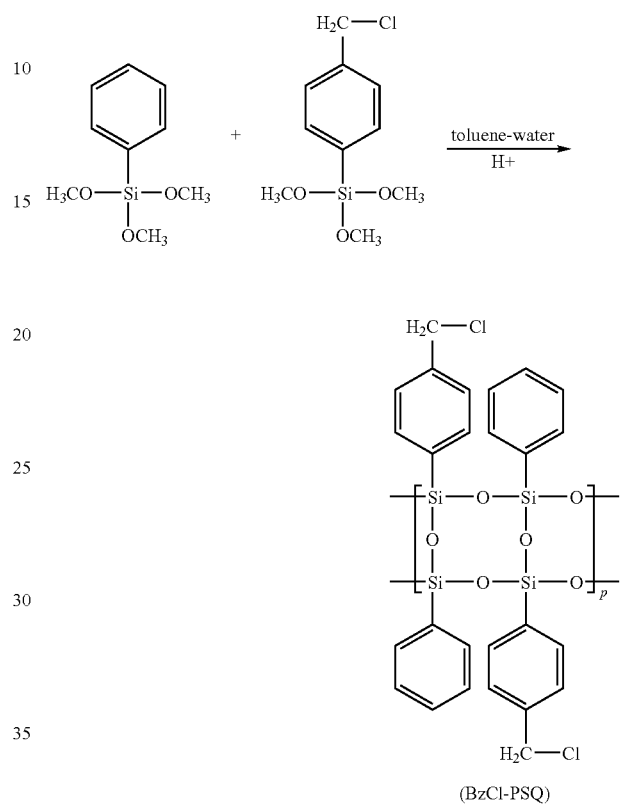

(BzCl-PSQ)

wherein p represents a positive integer.

A round bottom (teardrop or eggplant type) flask was charged with 15 ml of a toluene/water mixed solution (volume ratio=2/1), 4.00 g (0.02 mol) of phenyltrimethoxysilane, 5.0 g (0.02 mol) of p-chloromethylphenyltrimethoxysilane, and 0.202 g (5 mol %) of methanesulfonic acid. The mixture was stirred at room temperature for 12 hours. After completion of the reaction, an organic layer was separated from the reaction solution. Then, a residue obtained by evaporating the solvent under reduced pressure was added dropwise to a large quantity of n-hexane. The precipitated solid was filtered and dried to obtain the target polysilsesquioxane compound (BzCl-PSQ) (yield: 93%).

Figure 2:
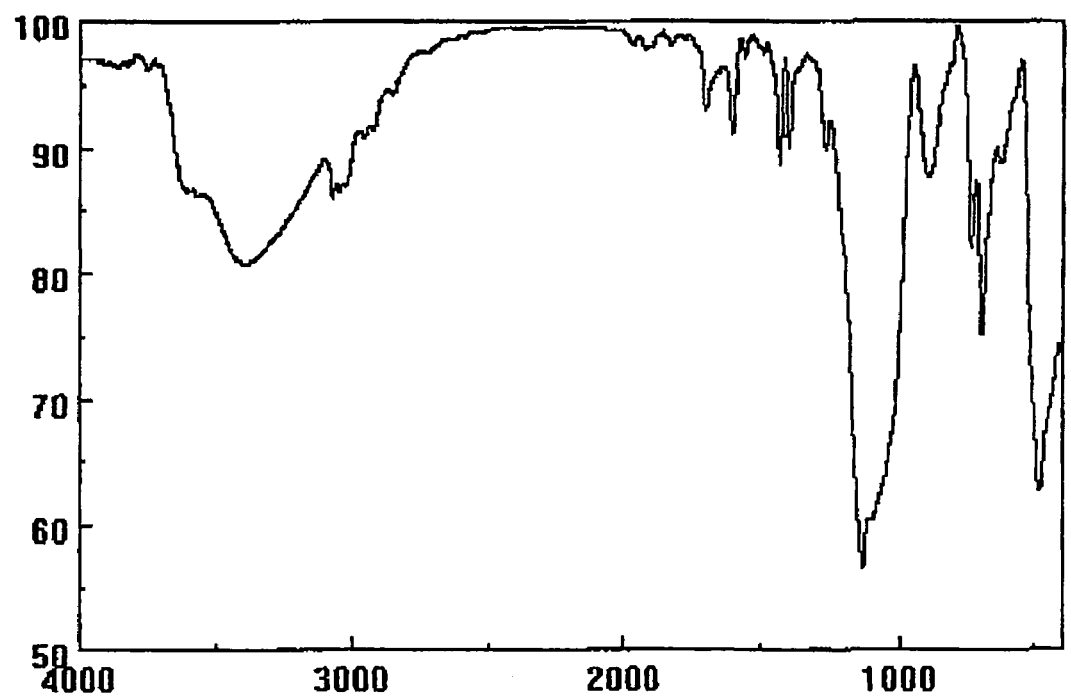
FIG. 2 is an IR spectrum diagram of polysilsesquioxane compounds (BzCl-PSQ) obtained in Examples 1 to 9 (1).

The structure of the resulting polymer was identified by measuring the $^1$H-NMR spectrum and the IR spectrum. FIGS. 1 and 2 respectively show the $^1$H-NMR spectrum (CDCl$_3$) and the IR spectrum (KBr) of the polysilsesquioxane compound (BzCl-PSQ). In FIG. 1, the vertical axis indicates the peak intensity, and the horizontal axis indicates the chemical shift (ppm). In FIG. 2, the vertical axis indicates the peak intensity, and the horizontal axis indicates the wave number (cm$^{-1}$). The number average molecular weight (Mn) of the polysilsesquioxane compound (BzCl-PSQ) was 1,300, and the molecular weight distribution (Mw/Mn) was 1.25.

(2) ) Synthesis of Polysilsesquioxane Graft Compound (Ini-PSQ) Including Dithiocarbamate Group

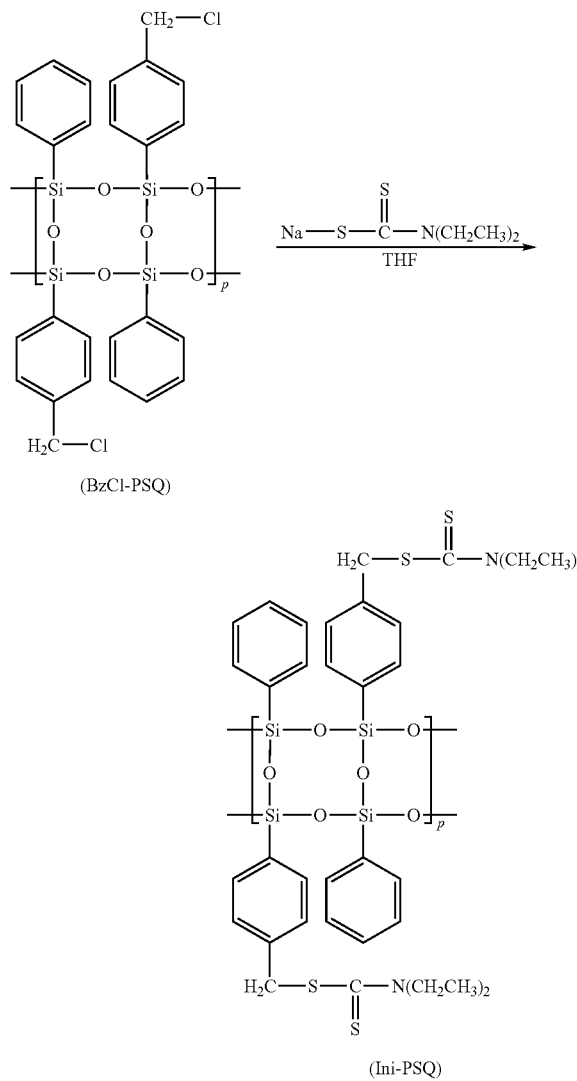

(BzCl-PSQ)

(Ini-PSQ)

wherein p represents a positive integer.

A round bottom (teardrop or eggplant type) flask was charged with 20 ml of tetrahydrofuran (THF), 1 g (2.2 mol) of the polysilsesquioxane compound (BzCl-PSQ) obtained in (1), 0.49 g (2.2 mol) of sodium diethyldithiocarbamate, and 0.202 g (5 mol %) of methanesulfonic acid. The mixture was stirred at room temperature for six hours. After completion of the reaction, an organic layer was separated from the reaction solution. Then, a residue obtained by evaporating the solvent under reduced pressure was added dropwise to a large quantity of n-hexane. The precipitated solid was filtered and dried to obtain the target polysilsesquioxane compound (Ini-PSQ) (yield: 90%).

Figure 3:
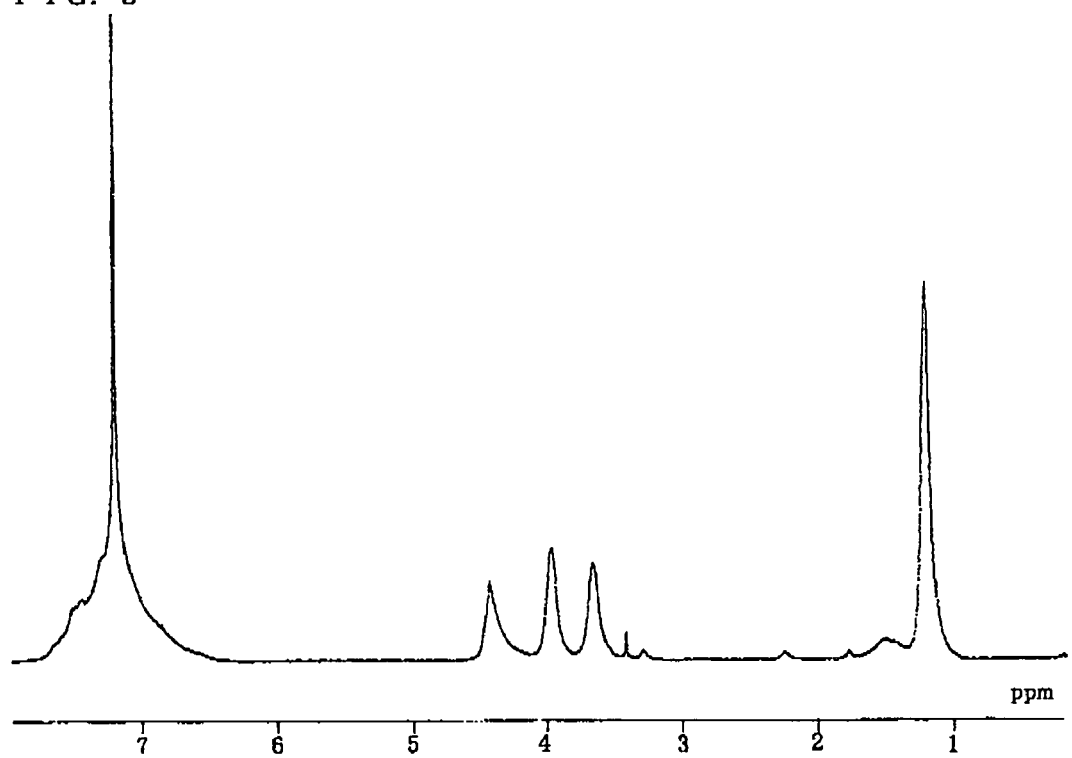
FIG. 3 is a $^1$H-NMR spectrum diagram of polysilsesquioxane compounds (Ini-PSQ) obtained in Examples 1 to 9 (2).
Figure 4:
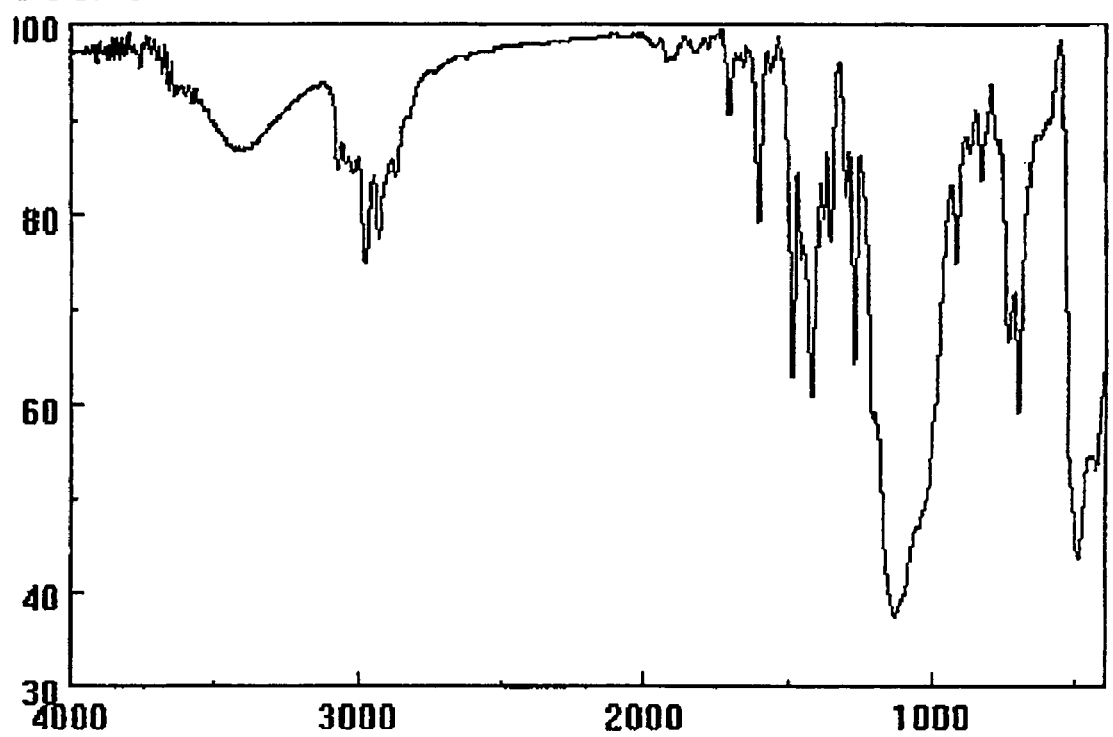
FIG. 4 is an IR spectrum diagram of polysilsesquioxane compounds (Ini-PSQ) obtained in Examples 1 to 9 (2).

FIGS. 3 and 4 respectively show the $^1$H-NMR spectrum ($CDCl_3$) and the IR spectrum (KBr) of the polysilsesquioxane compound (Ini-PSQ). In FIG. 3, the vertical axis indicates the peak intensity, and the horizontal axis indicates the chemical shift (ppm). In FIG. 4, the vertical axis indicates the peak intensity, and the horizontal axis indicates the wave number ($cm^{-1}$).

The number average molecular weight (Mn) of the polysilsesquioxane compound (Ini-PSQ) was 2,100, and the molecular weight distribution (Mw/Mn) was 1.3.

(3) Production of Polymer

A glass tube was charged with the polysilsesquioxane compound (Ini-PSQ) obtained in (2) as an initiator, 100 ml of a solvent, and monomers shown in Table 1 in a nitrogen atmosphere. The mixture was stirred at room temperature for three hours while applying ultraviolet rays using an ultraviolet irradiation device ("RH400" manufactured by Riko Kagaku. Sangyo Co., Ltd.).

After completion of the reaction, the reaction solution was added dropwise to a large quantity of n-hexane. The precipitated solid was filtered and dried to obtain polymers 1 to 9. Gelation due to coupling was not confirmed. Table 1 shows the yield (%), the number average molecular weight (Mn), and the molecular weight distribution (Mw/Mn) of the polymers 1 to 9.

In Table 1, MMA indicates methyl methacrylate, DMA indicates dodecyl methacrylate, DMAAm indicates N,N-dimethylacrylamide, and n-BA indicates n-butyl acrylate. The number of moles of the initiator indicates the initial number of moles per 1 g of the initiator.

TABLE 1

|  | Polymer | Monomer | Amount of initiator g (mmol) | Amount of monomer g (mmol) | Solvent | Yield (%) | Mn | Mw/Mn |
|---|---|---|---|---|---|---|---|---|
| Example 1 | 1 | MMA | 1.20 (0.45) | 50.0 (0.50) | Toluene | 65 | 45,000 | 2.11 |
| Example 2 | 2 | MMA | 1.20 (0.45) | 100.0 (1.00) | Toluene | 70 | 55,000 | 2.25 |
| Example 3 | 3 | DMA | 1.20 (0.45) | 127.2 (0.50) | Toluene | 68 | 20,000 | 2.16 |
| Example 4 | 4 | DMA | 1.20 (0.45) | 254.4 (1.00) | Toluene | 69 | 35,000 | 2.24 |
| Example 5 | 5 | DMAAm | 0.20 (0.45) | 0.13 (1.35) | THF | 81 | 3,100 | 2.1 |
| Example 6 | 6 | DMAAm | 0.20 (0.45) | 0.22 (2.23) | THF | 64 | 2,600 | 1.7 |
| Example 7 | 7 | DMAAm | 0.20 (0.45) | 0.22 (2.23) | Toluene | 64 | 2,800 | 1.4 |
| Example 8 | 8 | MMA | 0.20 (0.45) | 0.21 (2.05) | THF | 68 | 4,200 | 2.2 |
| Example 9 | 9 | n-BA | 0.20 (0.45) | 0.26 (2.05) | THF | 63 | 4,600 | 1.6 |

Figure 5:
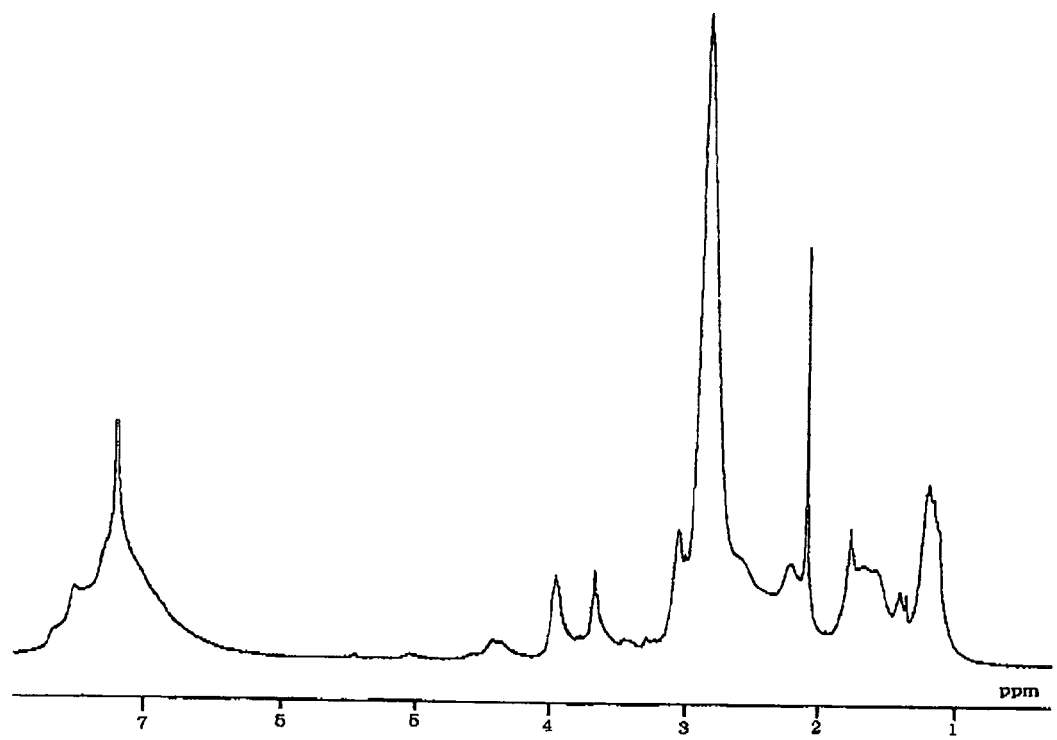
FIG. 5 is a $^1$H-NMR spectrum diagram of a polymer 5 obtained in Example 5.
Figure 6:
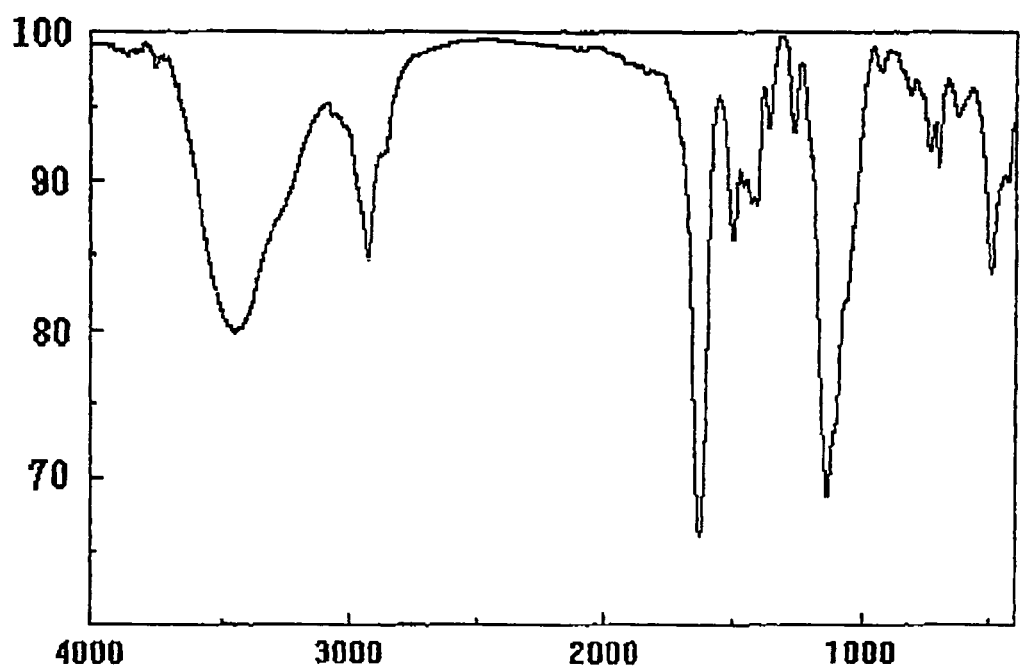
FIG. 6 is an IR spectrum diagram of the polymer 5 obtained in Example 5.

FIGS. 5 and 6 respectively show the $^1$H-NMR spectrum ($CDCl_3$) and the IR spectrum (KBr) of the polymer 5 obtained in Example 5. In FIG. 5, the vertical axis indicates the peak

Example 10

A glass tube was charged with 31.8 g of the polymer 4 (copolymer of Ini-PSQ and DMA) obtained in Example 4, 100 ml of toluene, and 12.5 g of MMA in a nitrogen atmosphere. The mixture was stirred at room temperature for three hours while applying ultraviolet rays.

After completion of the reaction, the reaction solution was added dropwise to a large quantity of n-hexane. The precipitated solid was filtered and dried to obtain a polymer 10 (copolymer of Ini-PSQ, DMA, and MMA) (yield: 70%). The number average molecular weight (Mn) of the polymer 10 was 20,000, and the molecular weight distribution (Mw/Mn) was 2.60.

Comparative Example 1

Production of Methyl Methacrylate-Dodecyl Methacrylate Copolymer by Radical Polymerization A glass tube was charged with 0.3 g (1.82 mmol) of AIBN as a radical initiator, 81.4 g (320 mmol) of dodecyl methacrylate (DMA), 16.0 g (160 mmol) of methyl methacrylate (MMA), and 100 ml of ethyl acetate in a nitrogen atmosphere. The mixture was stirred at 75° C. for 15 hours.

After completion of the reaction, the reaction solution was added dropwise to a large quantity of n-hexane. The precipitated solid was filtered and dried to obtain a polymer 11 (yield: 80%).

The number average molecular weight (Mn) of the polymer 11 was 27,000, and the molecular weight distribution (Mw/Mn) was 2.70.

Examples 11 and 12 and Comparative Example 2

Preparation of Pressure-Sensitive Adhesive 200 ml of ethyl acetate was added to 100 parts by weight (solid content) of the polymer obtained in each of Examples 4 and 10 and Comparative Example 1, and the mixture was sufficiently stirred to obtain a pressure-sensitive adhesive.

Examples 13 and 14 and Comparative Example 3

Preparation of Pressure-Sensitive Adhesive Sheet

The pressure-sensitive adhesive obtained in each of Examples 11 and 12 and Comparative Example 2 was applied to one side of a polyethylene terephthalate film (PET film) provided with a release treatment using a silicone resin with a thickness of 38 μm so that the thickness of the coating was 20 μm after drying. The applied pressure-sensitive adhesive was heated at 100° C. for two minutes to form a pressure-sensitive adhesive layer. A PET film with a thickness of 50 μm was then attached to the pressure-sensitive adhesive layer to obtain a pressure-sensitive adhesive sheet of each of Examples 13 and 14 and Comparative Example 3.

Adhesive Property Test

The holding power, adhesion, and probe tack of the pressure-sensitive adhesive sheet was measured in accordance with JIS Z0237. The measurement results are shown in Table 2.

Thermal Weight Loss Test

A thermogravimetric analysis (TGA) measurement was conducted using a thermogravimetric analyzer (manufactured by Shimadzu Corporation). In the measurement, 10 mg of the polymer was weighed and heated at 10° C./min in an air stream (100 ml/min). The measurement results are shown in Table 2. In Table 2, $WL_{300}$ indicates the weight loss rate at 300° C.

TABLE 2

| | Pressure-sensitive adhesive | Polymer | Holding power (sec) | Adhesion (N/25 mm) | Probe tack | $WL_{300}$ (%) |
|---|---|---|---|---|---|---|
| Example 13 | Example 11 | Polymer 4 | 100 | 15.0 | 412 | 7.3 |
| Example 14 | Example 12 | Polymer 10 | 11800 | 6.5 | 156 | 6.9 |
| Comparative Example 3 | Comparative Example 2 | Polymer 11 | 800 | 4.8 | 173 | 53.2 |

INDUSTRIAL APPLICABILITY

The production process according to the present invention allows a polysilsesquioxane graft polymer, in which various organic groups are introduced into a polysiloxane skeleton (inorganic skeleton), to be efficiently and easily produced by graft polymerization using an iniferter.

The polysilsesquioxane graft polymer obtained according to the present invention is useful as a pressure-sensitive adhesive component exhibiting excellent heat resistance and cohesive force.

The novel polysilsesquioxane compound according to the present invention may be suitably used as the raw material (iniferter) for the polysilsesquioxane graft polymer according to the present invention.

The invention claimed is:

1. A process for producing a polysilsesquioxane graft polymer including a repeating unit shown by the following formula (1) in the molecule,

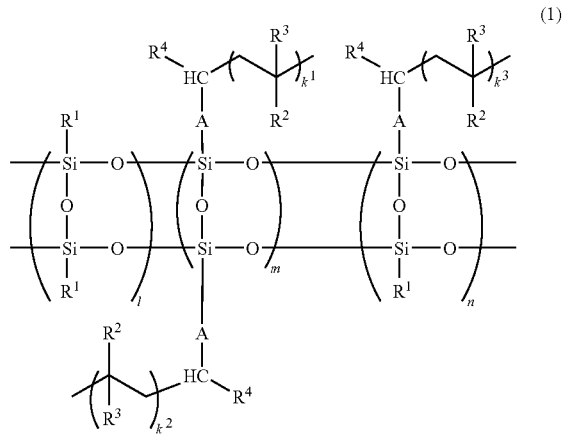

wherein A represents a linking group, R¹ represents a hydrocarbon group which may have a substituent, R² represents a hydrogen atom or an alkyl group having 1 to 18 carbon atoms, R³ represents a polar group or an aryl group which may have a substituent, R⁴ represents a hydrogen atom, an alkyl group having 1 to 6 carbon atoms, an ester group, or an acyl group, k¹, k², and k³ individually represent arbitrary positive integers, provided that, when k¹, k², and k³ respectively represent two or more, the groups shown by the formula: —CH₂—C(R²)(R³)— may be the same or different, and l, m, and n individually represent zero or an arbitrary positive integer, provided that the case where "m=n=0" is excluded, the process comprising applying ionizing radiation or heat to a mixture including a polysilsesquioxane compound including a repeating unit shown by the following formula (2),

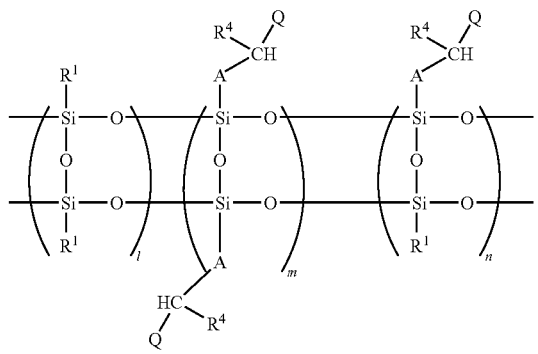

(2)

wherein A, R¹, R⁴, l, m, and n have the same meanings as defined above, and Q represents an iniferter group, and a vinyl compound shown by the following formula (3): CH₂=C(R²)—R³ (wherein R² and R³ have the same meanings as defined above).

2. The process for producing a polysilsesquioxane graft polymer according to claim 1, wherein ionizing radiation is applied to a mixture including the polysilsesquioxane compound including the repeating unit shown by the formula (2) in which Q is a photoiniferter group shown by the following formula: —S—C(=S)—Z (wherein Z represents a hydrocarbon group which may have a substituent, an alkoxy group, an aryloxy group which may have a substituent, an amino group which may have a substituent, or a phenyl group which may have a substituent) and the vinyl compound shown by the formula (3): CH₂=C(R²)—R³ (wherein R² and R³ have the same meanings as defined above).

3. The process for producing a polysilsesquioxane graft polymer according to claim 1 or 2, comprising:
condensing an alkoxysilane compound shown by the following formula (4): [XCH(R⁴)A]Si(OR⁵)₃ (wherein A and R⁴ have the same meanings as defined above, X represents a halogen atom, and R⁵ represents an alkyl group having 1 to 6 carbon atoms) and an alkoxysilane compound shown by the following formula (5): R¹Si(OR⁶)₃ (wherein R¹ has the same meaning as defined above, and R⁶ represents an alkyl group having 1 to 6 carbon atoms) in an amount of 0 to 100 parts by weight for 1 part by weight of the alkoxysilane compound shown by the formula (4) in the presence of an acid catalyst or a base catalyst;
reacting the resulting polycondensation product with a compound shown by the following formula (6): M[SC(=S)—Z]a (wherein Z has the same meaning as defined above, M represents an alkali metal atom, an alkaline earth metal atom, or a transition metal atom, and a represents the valence of M) to obtain a polysilsesquioxane compound including a repeating unit shown by the following formula (2') in the molecule,

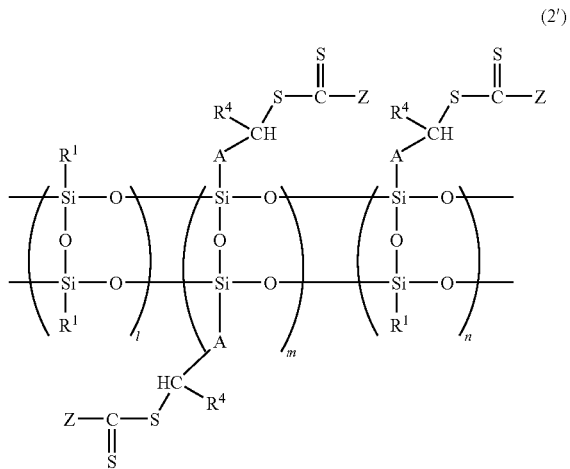

(2')

wherein A represents a linking group, R¹ represents a hydrocarbon group which may have a substituent, R⁴ represents a hydrogen atom, an alkyl group having 1 to 6 carbon atoms, an ester group, or an acyl group, l, m, and n individually represent zero or an arbitrary positive integer, provided that the case where "m=n=0" is excluded, and Z represents a hydrocarbon group which may have a substituent, an alkoxy group, an aryloxy group which may have a substituent, an amino group which may have a substituent, or a phenyl group which may have a substituent; and
applying ionizing radiation to a mixture including the resulting polysilsesquioxane compound and the vinyl compound shown by the formula (3): CH₂=C(R²)—R³ (wherein R² and R³ have the same meanings as defined above).

4. The process for producing a polysilsesquioxane graft polymer according to claim 1, wherein the polysilsesquioxane graft polymer has a number average molecular weight of 2,500 to 1,000,000.

5. A polysilsesquioxane compound comprising a repeating unit shown by the following formula (2'),

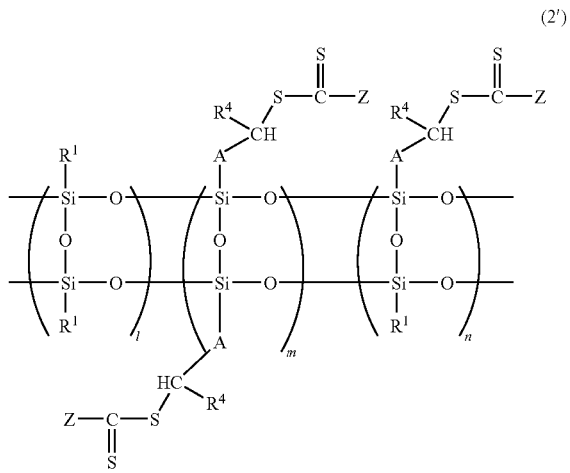

(2')

wherein A represents a linking group, $R^1$ represents a hydrocarbon group which may have a substituent, $R^4$ represents a hydrogen atom, an alkyl group having 1 to 6 carbon atoms, an ester group, or an acyl group, l, m, and n individually represent zero or an arbitrary positive integer, provided that the case where "m=n=0" is excluded, and Z represents a hydrocarbon group which may have a substituent, an alkoxy group, an aryloxy group which may have a substituent, an amino group which may have a substituent, or a phenyl group which may have a substituent.

6. A pressure-sensitive adhesive comprising a polysilsesquioxane graft polymer obtained by the process according to claim 1.

7. A pressure-sensitive adhesive sheet comprising a substrate sheet, and a pressure-sensitive adhesive layer formed on the substrate sheet and including the pressure-sensitive adhesive according to claim 6.

* * * * *